Patented Dec. 19, 1933

1,939,858

UNITED STATES PATENT OFFICE 1,939,858

METHOD OF POTASSIUM PHOSPHATE CONVERSION

Curtis B. Locklin, Los Angeles, Calif.

No Drawing. Application February 10, 1931
Serial No. 514,915

1 Claim. (Cl. 71—7)

This invention relates to a novel process or method of mixing materials containing a soluble potassium compound with phosphate containing material, and a small amount of the sulphates and carbonates of sodium and potassium and calcining the mixture to produce a conversion of the insoluble phosphate and the potassium compound to available phosphoric acid and a soluble potassium compound, but when economy demands, then the potassium compound can be an insoluble one and the sulphates and carbonates are increased.

One of the objects of the present invention is to find a simple, efficient, and inexpensive method of treating phosphate rock and potassium-bearing material whereby a continuous, uninterrupted, and regulated or predetermined quantity and quality of the resultant material may be advantageously obtained.

A further object of this invention is to provide a practical, satisfactory process for converting phosphate rock and potassium bearing compounds which admits of preregulating and predetermining not only the volume but the consistency of the material as well as of the final product obtained.

Another object thereof is to carry out the steps of this process in such a manner as to increase the percentage of phosphoric acid and soluble potassium compounds in the final output of the resultant product over other methods in use today for accomplishing the same purpose.

A still further object of this invention is to be able to control the raw materials in conjunction with a wet method of treatment of phosphate rock and potassium material or compounds for the distinct purpose of obtaining a definte quantity and quality of the final product before the calcining operation takes place.

Heretofore in the conversion of insoluble phosphate rock and potassium-bearing silicates or other potassium-bearing materials or rocks to produce available phosphoric acid and soluble potassium compounds it has not been possible to predetermine the ultimate amount or specifications of the final product obtained, so that if it were proposed to produce a given quantity and quality of the product, there would always be the hazard of obtaining less or more, hence from the standpoint of practical treatment of the materials and controlling the output from the very beginning the conventional methods were found wanting.

By the aid of the steps of my present process I am able to employ a wet method, instead of the dry method usually resorted to heretofore, and I am able to allow freer latitude as concerns working upon easily obtainable indigenous materials or insolubles obtainable where economy dictates, instead of being confined to the employment of solubles which are mostly imported from abroad at greater expense.

As a consequence of my alternative method of treating insolubles or solubles I now enable those skilled in the art to make up a definite amount of the product as per the actual need and as per definite specifications, so that complete regulation of the initial steps of treatment will respond to turning out the required quota.

The present method produces a composition of matter which is useful in the manufacture of fertilizers and it is customary to prepare such compositions as and when needed in definite quantities and quality of such product, to satisfy trade requirements. A method of turning out the product which fails to give the desired amount and quantity called for at the start is subject to embarrassment and trade inconvenience. Having familiarized myself with the conventional methods in the reduction or treatment of phosphate rock and potassium-bearing rock or other potassium materials to convert them into available phosphoric acid and a soluble potassium compound, I noted the deficiency hereinbefore stated. In an effort to overcome this defect and to render the working of the method consistent with yielding a predetermined output I discovered that the following steps of procedure is conducive to the desired result.

In carrying out my method I proceed as follows: I first obtain a saturated solution containing a soluble potassium salt or compound by any of the ordinary and approved methods, then I pump this solution or brine into a vat or tank for future use and next add a small amount of the sulphates and carbonates of potassium and sodium, then ascertain the percentage of potash in the solution in the vat.

Should economy demand that an insoluble potassium compound be used, then the sulphates and carbonates of potassium and sodium in the brine are increased and the soluble potassium salt decreased, keeping in mind the molecular balance in the chemical equation between the insoluble potassium compound and the sulphates and carbonates and phosphates. This balance would probably require equal amounts of the sulphates and carbonates (in the aggregate) and the insoluble potassium compound, and phosphate rock used equal to the sum of these two amounts.

It is at this initial stage that I am able to control the operation and to make it possible to obtain ultimately a net predetermined amount and quantity of the final product.

As the next succeeding step of my novel method I weigh out a definite quantity or amount of phosphate rock or material either ground or crushed and dump or deposit the same in the vat. Knowing the mixture of the soluble potassium and phosphate compounds desired, I add a given quantity of the brine into the vat, containing the phosphate rock, thereby getting a mass of the consistency of a wet mash or mud, the materials being all brought together and intimately mixed until a flowing liquid mass is produced. The mud thus produced can very readily be assayed to determine definitely the percentage of potash and phosphates therein. This having been attended to and the application of brine water to the materials having been completed the resultant mass may now be run into a calcining machine, furnace, or kiln and finished in any manner desired.

From the foregoing, it will be seen that a method is provided for mixing materials containing a soluble potassium compound with phosphate containing material and a small amount of the sulphates and carbonates of sodium and potassium, and thereafter calcining the mixture to produce a conversion of the insoluble phosphates and the potassium compound to available phosphoric acid and a soluble potassium compound, but when economy demands then the potassium compound could be an insoluble one and the sulphates and carbonates then increased.

I do not mean to limit myself to the exact details of the matter herein set forth but will cover all variations falling within the purview of the appended claim.

What I desire to claim and secure by Letters Patent is:

The method of producing a predetermined quantity and quality of fertilizer from an admixture of materials containing a soluble potassium compound, with phosphate-containing material which consists in first preparing a saturated solution containing soluble potassium salt in the form of a brine, next pumping the prepared brine into a storage receptacle and reserving same for eventual use, then adding to this mass a small amount of sulphates and carbonates of potassium and sodium, thereafter, when the water of the mixture has become saturated, ascertaining the percentage of potash in the solution to determine the necessity for an increase or diminution in the relative proportions of the sulphates and carbonates of potassium and sodium in the brine to maintain the necessary molecular balance of the ultimate product, thereafter weighing out a definite amount of assayed phosphate material in ground form and depositing same in a vat, then transferring the predetermined quantity of the brine into the vat, next ultimately mixing all the materials into an assayable mud, and lastly calcining the resultant mixture in a closed furnace.

CURTIS B. LOCKLIN.